March 22, 1955 K. RAUCH 2,704,634
METHOD AND MEANS FOR CONTROLLING AN APPARATUS
Filed July 2, 1949 2 Sheets-Sheet 2

INVENTOR
KONRAD RAUCH

BY *Karl Benst*

HIS ATTORNEY

United States Patent Office 2,704,634
Patented Mar. 22, 1955

2,704,634

METHOD AND MEANS FOR CONTROLLING AN APPARATUS

Konrad Rauch, Dayton, Ohio, assignor to The National Cash Register Company, Dayton, Ohio, a corporation of Maryland Application July 2, 1949, Serial No. 102,843

1 Claim. (Cl. 235—61.11)

This invention relates to a novel method and means for controlling a record-controlled apparatus.

In the novel method of control, normally inactive activatable data-representing means is applied at selected points on a record member according to the data being represented thereby, which inactive data-representing means is incapable of being sensed to control an apparatus. Then the inactive, latent, data-representing means is activated to render it capable of being sensed. Thereafter the activated record member is sensed to thereby control the operation of the apparatus according to the data on the record member.

The record member utilized in the novel method may be in the form of a tape, a statistical card, a bank check, a railroad or other ticket, a waybill, or any other document, and the data-representing means consists of spots or marks of substances which are normally ineffective and inactive and cannot be sensed by a sensing means, such as unmagnetized magnetizable material, unactivated fluorescent material, or unactivated phosphorescent material, and which must be activated by being magnetized or by being subjected to the proper kind of radiation, as the case may be, to render them effective on a sensing means. The record member, per se, is disclosed and claimed in my co-pending patent application Serial No. 97,222, which was filed on June 4, 1949, now abandoned.

The novel method has the advantage that the record members can be stored with their data-representing means inactive, and the data-representing means can be activated each time it is desired to use them to control an apparatus. This feature is particularly important when the magnetic type of data-representing means is used, because it will insure a maximum signal at the time of its use and will minimize any loss or change of magnetism during storage of the members.

The novel method of control has the further advantage that it enables a single record member to serve as a multipurpose control member when certain data is applied thereto by the use of data-representing means which can be activated by one type of activation and other data is applied thereto by the use of data-representing means which can be activated by another type of activation. By the use of appropriate sensing means and proper activation, either or both sets of data can be activated and thereby rendered selectively effective to control an apparatus, even when all or a portion of both sets of data occupy the same zone on the record member.

The novel method has the further advantage that an extremely simple recording means can be used to place the inactive data-representing means of either or both types on the record members and an activating means can serve to activate the data-representing means applied by any desired number of recording means.

When the multi-purpose feature is not desired, any one of the normally inactive substances may be applied to the record member to form thereon data representations which can be subsequently activated to make them capable of being sensed by a suitable sensing means.

The novel method has the further advantage that confidential information can be put on record members by use of the normally inactive data-representing means in a form which is indistinguishable from the members. These data-representing means will not be apparent to anyone handling the members, and, since they are normally inactive, they will be ineffective to exert a control on a sensing means. The data-representing means on the record member can be activated by authorized persons to whom the required type of activation is known and thereby made effective to be sensed by a sensing means.

It is an object of the invention to provide a novel method and means for controlling record-controlled apparatus by providing record members with normally inactive activatable data-representing means, thereafter activating the normally inactive data-representing means to enable it to be sensed by a suitable sensing means, and then sensing the activated data-representing means to control an apparatus accordingly.

A further object of the invention is to provide a novel method of controlling record-controlled apparatus whereby, by the use of a plurality of types of inactive activatable substances to record data on record members, each of which types is activated by a different type of activation, the capacity of the record members to receive data is increased, as are also the available controls for the record-controlled apparatus.

A further object of the invention is to provide a novel method of controlling record-controlled apparatus by utilizing record members having latent activatable data-representing means thereon, in which method the members are stored with the latent, unactivated data-representing means thereon, and are removed from storage and the latent data-representing means thereon activated whenever it is desired to use the record members to control the record-controlled apparatus.

A further object of the invention is to provide a novel method of controlling a record-controlled apparatus in which data on a controlling record member is not apparent to anyone handling the record member and also is ineffective on a sensing means until activated by an authorized person to whom the nature of the required activations is known.

A further object of the invention is to provide a recording means which can record data on a record member in one or more types of normally unactivated activatable material.

A further object of the invention is to provide a recording means for applying inactive activatable data-representing means to record members, and to provide means to activate the data-representing means to render them effective to be sensed.

A further object of the invention is to provide means to activate normally inactive data-representing means on record members and render the data-representing means effective to be sensed.

Other objects of the invention will become apparent from the following description and claims and the accompanying drawings, which disclose, by way of example, a preferred embodiment of the invention.

Figure 1:
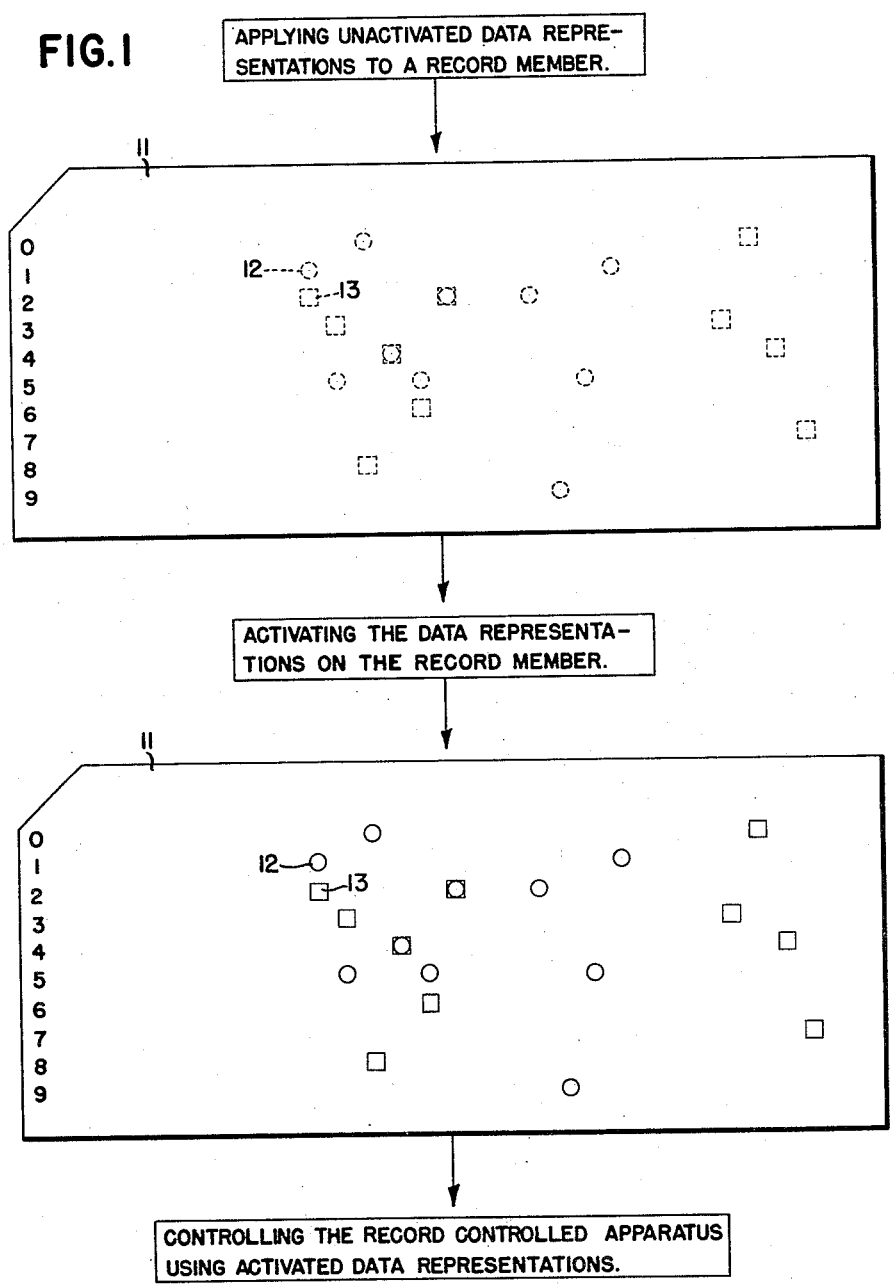
Fig. 1 is a flow chart showing the steps making up the novel method for controlling record-controlled apparatus.

The various steps in the novel method of control of record-controlled apparatus are shown diagrammatically in Fig. 1. In order to explain the invention, the record member used in the novel method of control is shown as a conventional type of record card, but it will be obvious that other types of record members can be used.

In the first step of the novel method, data-representing means are applied to the card 11 at points corresponding to the data to be represented thereby.

The data-representing means is in the form of marks of normally unactivated substances, which marks can be recorded on the card by applying the substance thereto at desired points by means of a pen or other applicator or by means of a printing mechanism which may be a unit of itself or an attachment to another machine to be controlled thereby, and which can deposit the unactivated substances on the card from a ribbon or transfer sheet in a simple printing operation.

Two types of data-representing means are shown applied to the card in Fig. 1, and, to make their identity more apparent, one type is shown in the form of round marks, as 12, and another type is shown in the form of square marks, as 13. The round marks represent the type of data-representing means which consists of non-magnetized magnetizable material, such as iron oxide contained in an ink or a suitable binder, and the square marks represent the type of data-representing means which consists of unactivated photosensitive fluorescent or phosphorescent material, such as willemite or anthracene, contained in an ink or binder.

The marks are shown in dotted outline to indicate that they are in their inactive state.

It is not intended to limit the invention to the use of the particular normally inactive materials set out above in order to explain the invention, because other materials, which are normally inactive but which can be activated to render them effective to be sensed by a sensing means, can also be used. Furthermore, neither of the marks need have the shape shown but may have any shape and be applied in any location that may be required for the system of controls called for by the machine or machines to be controlled.

The cards to which the normally inactive data-representing means have been applied can be handled and stored in the usual manner, but they are ineffective and are not capable of being sensed by the sensing means of a record-controlled apparatus.

The next step in the novel method of control is to activate the normally inactive activatable data-representing means on the cards.

When the data-representing means is of the magnetic type, it will be activated by placing one or more cards in a strong D. C. or steady magnetic field to magnetize the marks and render them capable of generating a voltage in a magnetic pick-up or sensing unit when the cards are moved relatively thereto. If desired, the data-representing means on the cards can be demagnetized or de-activated after being used to exert the desired control and can be remagnetized before being used again.

When the data-representing means is of the photosensitive type, it will be activated by being subjected to radiation of the proper wave length and made to fluoresce or glow and thereby render the data-representing means capable of being sensed by a photocell pick-up or sensing means.

It is obvious that the unmagnetized marks which have been magnetized and are storing magnetic energy and the photosensitive marks which have been activated and are glowing have had their energy level raised by the activation.

The marks 12 and 13 are shown in full lines on the card near the lower part of Fig. 1 to indicate that they have been activated and are capable of being sensed by appropriate sensing means.

It should be noted that, since the data-representing means on a card are normally inactive and are ineffective until they are activated, it is possible to have both types of data-representing means on the same zone of a card and, by selectively activating them, render them effective to exert their controls without interfering with each other. This enables the capacity of the card and consequently the possible controls thereby to be doubled.

The third step is to sense the activated data-representing means and to control the record-controlled apparatus thereby.

The record-controlled apparatus, which may be a tabulator, sorter, printer, or any other of the well-known types of record-controlled apparatus, is provided with sensing means to sense the activated data-representing means and cause control signals to be sent to the apparatus to cause the desired operation thereof to take place.

When the magnetic type of data-representing means is being used, a magnetic pick-up or sensing unit is provided for each card column, and, as the card moves past the pick-up unit, the activated data-representing means, due to its magnetization, will generate a voltage in the pick-up circuit and provide a signal which can control the apparatus. Such a signal could not have been obtained from an unactivated, demagnetized data-representing means.

Similarly, when the photosensitive type of data-representing means are being used, a photo-cell pick-up device will be provided for each card column, and the fluorescing or glowing activated data-representing means will be effective on the photo-cell to generate a signal which can control the apparatus.

The novel method is well adapted to the use of confidential data to control an apparatus. This confidential information can be printed on the card, using the normally inactive materials in an invisible ink or in an ink of a color which makes a mark which is indistinguishable from the card or colored areas on the card. These marks will not be apparent to anyone handling the card, and, since they are normally inactive, they will be ineffective to control an apparatus. An authorized person to whom the required type of activation is known can cause the data representations to be activated and made effective to control a record-controlled apparatus. For example, the amount of a check can be printed thereon using amount-representing, indistinguishable marks of inactive, activatable material as well as readily readable figures. A person at a bank can activate the inactive marks on the check and send the check through a record-controlled printing apparatus which will print on the check the amount represented by the marks. A comparison of the amount printed in readable figures on the check when it was made and the amount printed by the record-controlled means will show whether or not the amount of the check, as indicated by the readable figures placed thereon when it was made, has been improperly increased.

Figure 2:
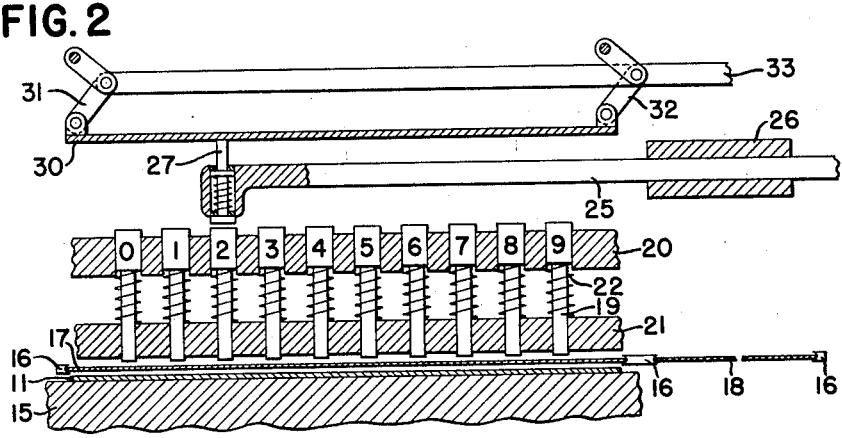
Fig. 2 is a section through a portion of a recording means which applies data-representing means to record members.

In the preferred form of the invention, the data-representing means are applied to the card by a printing means. Fig. 2 shows a section through a portion of a printing means for printing data representations in one column of the card 11 of Fig. 1. The card 11 is supported on a platen 15 beneath a shiftable ribbon-supporting frame 16, which supports two ribbons 17 and 18 and which is shiftable to bring one or the other of the ribbons above the card, depending upon the type of data-representing means to be applied to the card. The ribbon 17 is impregnated with unmagnetized magnetizable ink, and the ribbon 18 is impregnated with an unactivated photosensitive ink.

A plurality of depressible printing members 19, one for each index point position in the card column, are mounted in guide plates 20 and 21 and are spring-pressed to their normal upper position by springs 22.

A selector member 25 is supported in a guide member 26 for movement, either manually or by some suitable apparatus, above the printing members and has, near its end, a plunger 27, which can be positioned over any desired one of the printing members 19 to depress it.

A depressing plate 30, mounted on toggles 31 and 32, can engage the plunger 27 in any of the moved positions of the selector member 25 to depress the selected printing member 19 and cause a data-representing mark to be applied to the card from the ribbon. Movement of a rod 33 to the left (Fig. 2) will depress the plate and cause the mark of unmagnetized magnetic material to be made on the card.

Simply by shifting the ribbon 18 over the card in place of the ribbon 17, marks of unactivated activatable photosensitive material will be made on the card.

It is to be understood that a selector member, as 25, and a row of printing members, as 19, will be provided for each column on the record card and that the platen 15 and the depressing plate 30 will extend across the several selector members and rows of printing members.

The cards prepared by the recording means can be stored with the data-representing means thereon in their inactive condition. When it is desired to use the cards to control an apparatus, they can be activated.

Figure 3:
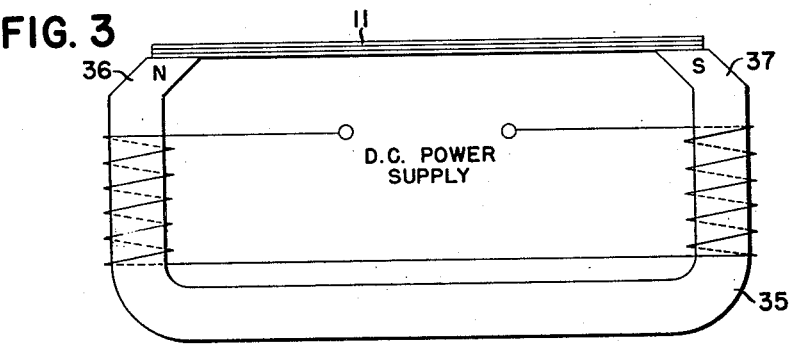
Fig. 3 is a steady magnetic field activating magnet for activating or magnetizing normally unmagnetized magnetizable data-representing means.

If the data-representing means to be activated is of the magnetizable material type, a stack of cards having inactive data representations thereon is placed in a steady magnetic field of a magnet 35 (Fig. 3), which may be an electromagnet energized from a D. C. power supply, as shown, or may be a permanent magnet. Preferably the magnet has pole pieces 36 and 37, which extend across the card columns, and the cards will be placed thereon with the columns extending from one pole to the other. When the cards are removed from the magnetic field, the marks thereon will have been activated by being magnetized, and they will be capable of inducing voltages in the usual type of magnetic pick-up or sensing means of a record-controlled machine.

It should be noted that, with the novel arrangement, a central magnetizing means can serve one or more recording means, eliminating the magnetizing means at each recording means and thereby simplifying the recording means.

Figure 4:
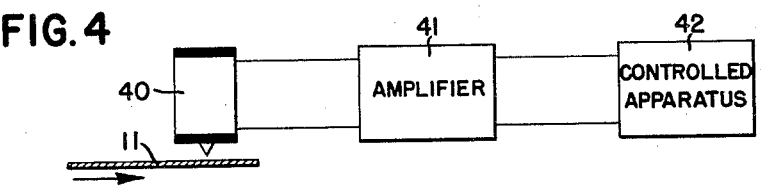
Fig. 4 is a diagrammatic showing of a record-controlled apparatus which can be controlled by the activated magnetizable data-representing means.

The activated cards are then used to control a record-controlled apparatus. Fig. 4 is a diagrammatic showing of a record-controlled apparatus which can be controlled by the magnetized marks on the card. As the card 11 is fed past the magnetic pick-up or sensing unit 40, the magnetized mark will cause a voltage to be generated in a coil of the unit to produce a signal at a time corresponding to the data represented in the column of the card. The signal thus produced is amplified by amplifier 41 and used to control any of the well-known types of record-controlled apparatus, shown diagrammatically at 42, such as a tabulator, sorter, printer, verifier, or any other machine. While only one magnetic pick-up unit is shown, it is to be understood that one of these units is provided for each column on the card.

If desired, the marks on the cards can be demagnetized or deactivated after the cards have been used to exert their control and can be remagnetized before being used again. This will insure maximum magnetization of the marks at the time of their use and will minimize any loss or change of magnetism during storage of the cards.

Figure 5:
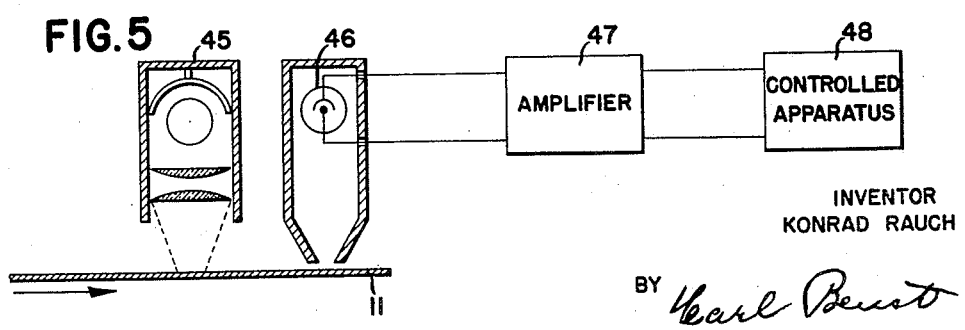
Fig. 5 is a diagrammatic showing of an activating means for photosensitive data-representing means and record-controlled apparatus which can be controlled by the activated photosensitive data-representing means.

If the data-representing means to be activated is of the photosensitive type and contains a fluorescent or phosphorescent material, the cards bearing this material will be fed past a suitable source of radiation 45 (Fig. 5), which will activate the unactivated material in the data-representing means and make it fluoresce or glow. The fluorescing or glowing data-representing means will be effective on a photo-cell pick-up unit 46 to generate a signal according to the data represented thereby. The signal thus generated can be amplified by a suitable amplifier 47 and used to control any of the well-known types of record-controlled apparatus mentioned above.

It is to be understood that the activating means 45 will extend across all the columns of the record card and that a photo-cell pick-up unit, as 46, will be provided for each column on the card. The activation of the fluorescent or phosphorescent materials should be so coordinated with the card feed and with the type of material used that maximum glow or fluorescence of the data-representing means will occur at the sensing point.

Accordingly it is seen that the novel method and means for controlling record-controlled machines which utilize record members with normally inactive activatable data-representing means thereon have the advantages that they enable the record members to have double capacity for data and controls; they allow the storage of the record members in their inactive condition and require them to be activated just before the time they are to be sensed; and they enable confidential control data to be utilized to control a machine through the use of invisible inactive data representations which can be made active by an authorized person to whom the required type of activation is known.

While the method and means shown and described herein are admirably adapted to fulfill the objects previously stated, it is to be understood that it is not intended to confine the invention to the particular steps and means herein disclosed, for it is susceptible of being embodied in other steps and means all coming within the scope of the invention.

What is claimed is:

The method of controlling record-controlled apparatus which consists in applying to a record member certain data-representing marks of one type of inactive marks of material and applying other data-representing marks of another type of inactive activatable material, neither of which types of marks is capable of being sensed until it has been activated; and selectively activating the marks of one of said types of marks to raise their energy level and render them effective to be sensed so that only the activated marks will be effective to control a record-controlled apparatus thereby, whereby said certain marks or said other marks can be selected to control the apparatus merely by raising the energy level of the material of the marks which are to control.

References Cited in the file of this patent

UNITED STATES PATENTS

| | | |
|---|---|---|
| 926,054 | Doane | June 22, 1909 |
| 1,831,359 | Lasker, Jr. | Nov. 10, 1931 |
| 1,911,994 | Edwards | May 30, 1933 |
| 2,000,403 | Maul | May 7, 1935 |
| 2,089,293 | Paine et al. | Aug. 10, 1937 |
| 2,107,008 | Lasker | Feb. 1, 1938 |
| 2,224,646 | Friedman | Dec. 10, 1940 |
| 2,254,933 | Bryce | Sept. 2, 1941 |
| 2,262,492 | Farrell | Nov. 11, 1941 |
| 2,268,499 | Bryce | Dec. 30, 1941 |
| 2,294,681 | Moon | Sept. 1, 1942 |
| 2,299,107 | Potts | Oct. 20, 1942 |
| 2,325,941 | Dickinson | Aug. 3, 1943 |
| 2,431,017 | Ayres | Nov. 18, 1947 |
| 2,508,953 | Knutsen | May 23, 1950 |
| 2,547,838 | Russell | Apr. 3, 1951 |

FOREIGN PATENTS

| | | |
|---|---|---|
| 412,180 | Great Britain | June 18, 1934 |